Oct. 31, 1967  J. A. FLINT ETAL  3,349,853
HELICOPTER LIFT CONTROL MECHANISM
Filed May 24, 1965  3 Sheets-Sheet 1

JOHN AVERY FLINT
JAMES ERIC GEORGE
Inventors
By
Stevens, Davis, Miller & Mosher
Attorneys Oct. 31, 1967  J. A. FLINT ETAL  3,349,853
HELICOPTER LIFT CONTROL MECHANISM
Filed May 24, 1965  3 Sheets-Sheet 3

JOHN AVERY FLINT
JAMES ERIC GEORGE
Inventors
By
Stevens, Davis, Miller & Mosher Attorneys United States Patent Office 3,349,853
Patented Oct. 31, 1967

3,349,853
HELICOPTER LIFT CONTROL MECHANISM
John Avery Flint and James Eric George, Farnborough, England, assignors to Power Jets (Research and Development) Limited, London, England
Filed May 24, 1965, Ser. No. 458,047
Claims priority, application Great Britain, May 29, 1964, 22,347/64
16 Claims. (Cl. 170—135.4)

ABSTRACT OF THE DISCLOSURE

A helicopter rotor having blades of substantially circular cross-section on which lift is induced by blowing streams of air over the surfaces of the blades from slots formed therein, and a hub comprising a fixed pillar with a rotatable head mounted thereon. The air supply to the slots passes by way of a ring of segmental channels disposed around the pillar to transfer ports in the head and then to the appropriate blade. Slide valves, one in each of the segmental channels, are operated through push rods from a swash plate mounted around the pillar and serve to throttle the air according to the angle of the swash plate. Hydraulic actuators are carried by the swash plate and act on the push rods so that the positions of the valve may be altered independently of the swash plate angle.

---

This invention relates to helicopter rotors and more specifically to mechanism for controlling the aerodynamic lift on helicopter rotor blades.

British patent specifications Nos. 944,010, 948,947 and 956,013 relate to aircraft including helicopter rotors having blades of substantially circular cross-section. Lift on these blades is induced by discharging streams of compressed air rearwardly from one or more shallow spanwise extending apertures formed in the surface of each blade. The arrangements described in the aforesaid specifications effectively dispense with the blade hinges associated with rotors having blades of more conventional aerofoil section. Additionally the air discharge from the blade apertures is controlled to effect cyclic and collective alterations in blade lift similar to those obtained by blade incidence variation in the conventional type rotor. According to the above specifications this is done in various ways all involving some what cumbersome mechanisms in the rotating head of the rotor hub assembly.

Applicants' co-pending prior U.S. patent application Ser. No. 408,106, now U.S. Patent No. 3,288,225 directed to a simplified rotor hub construction for use with blades preferably of substantially circular cross-section wherein means for varying the aerodynamic lift on the blades is associated with non-rotating structure.

In conventional helicopters, the cyclic pitch control mechanism gives rise to a simple harmonic variation of blade pitch and lift. In fact however the lift variation required in forward flight does not follow a simple harmonic law. When a helicopter moves into forward flight the airflow through the rotor disc changes, the flow being reduced at the front and increased at the rear of the disc. This change in induced flow pattern is one reason why the variation in lift upon a blade does not follow a sinusoidal pattern in azimuth. As the forward speed of the helicopter is increased while keeping the rotor tip speed constant the second and higher harmonic forces increase so giving an increasing vibration level.

To allow for this, helicopter rotor blades normally embody flapping hinges which serve to reduce the vibration which would otherwise occur. It is however a feature of the aircraft of the prior patent applications that in operation the blades are locked at a predetermined coning angle, no flapping hinges being provided and so if vibration is to be minimised it is necessary to depart from the simple harmonic variation of lift imposed by a swash-plate or equivalent mechanism. Accordingly the present invention is concerned with the provision of a mechanism whereby the desired relationship between rotor rotation and blade lift may be established.

The invention is not however limited in its application to aircraft of the type described in the prior patent applications but could also be utilised in other forms of helicopter in which lift on the blade is to be varied by the control of spanwise extending fluid streams discharged therefrom.

According to the invention, a control mechanism for helicopters having rotors with blades of substantially circular cross-section comprises means for modulating the aerodynamic lift on the rotor.

An embodiment of the invention will now be described by way of example with reference to the accompanying diagrammatic drawings of which:

Figure 1:
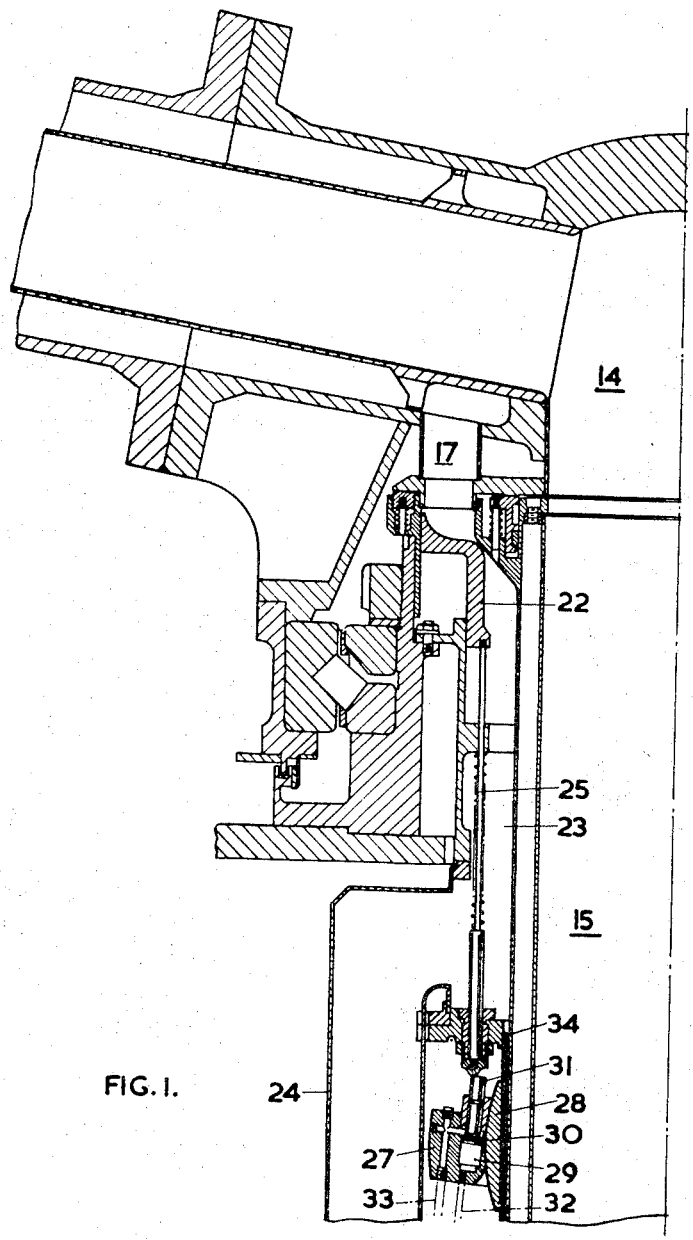
FIGURE 1 is an axial sectional view of a helicopter rotor hub assembly.
Figure 1:
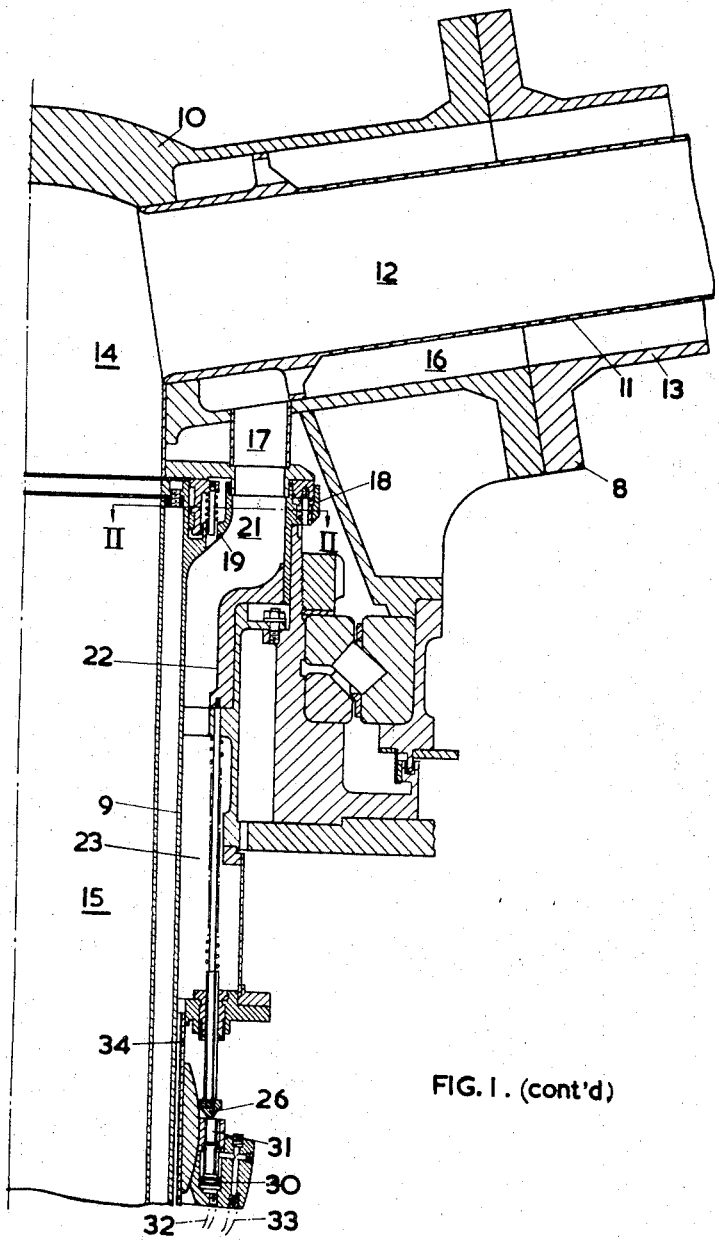

As shown in FIGURE 1 the hub assembly is generally similar to that described in U.S. Patent No. 3,288,225 and is constituted by a hollow pillar 9 and a rotating head 10 mounted on the pillar. The pillar has double walls for insulation purposes and is suitably supported in the aircraft structure, while the rotating head forms a root attachment for the rotor blades 8. The rotor blades are of substantially circular cross-section and are driven by jet propulsion nozzles (not shown) mounted at their tips. With blades of such section, aerodynamic lift must be induced by boundary layer control and preferably this is done by forming the blades with long shallow apertures extending along the blade span and arranged to discharge fluid streams as thin layers over the blade surfaces. The aforementioned prior patent specifications disclose examples of blades with such apertures. The blades each comprise a liner 11 forming a duct 12 extending along the length of the blade internally thereof through which gases for propulsion are led to the jet propulsion nozzles, and an outer shell 13. The liner 11 extends inwardly beyond the shell 13 and terminates within the rotating head 10.

The duct opens out of a chamber 14 in the rotating head which chamber in turn is in communication with a space 15 within the hollow pillar 9 whence are led jet streams discharged from the aircraft power plant as will be described later. The annular space between the liner and the shell serves as a passage 16 to conduct air to the discharge apertures (not shown) formed in the surface of the blade proper.

Figure 2:
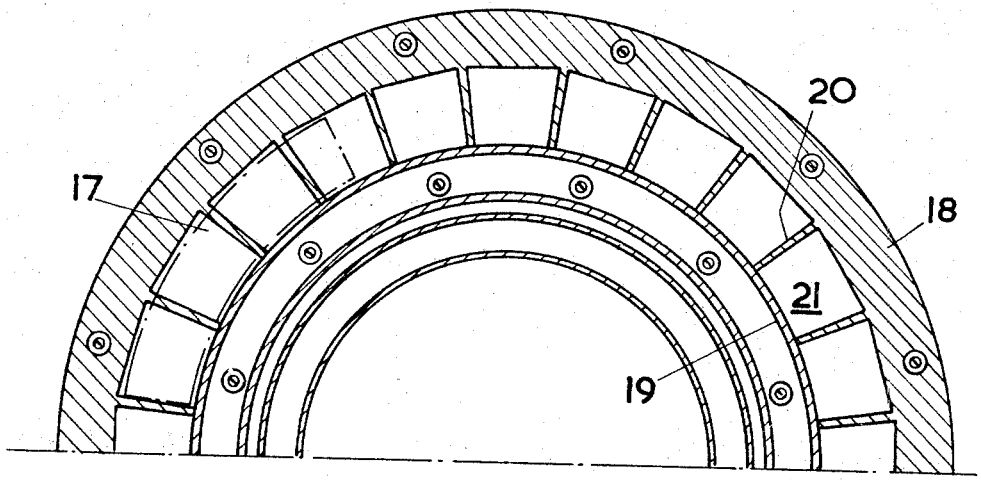
FIGURE 2 is a half sectional view through the rotor hub assembly taken on the line II—II in FIGURE 1.

The air for the discharge apertures enters the blades through transfer ports 17 formed in the rotating head, each transfer port being associated with a single rotor blade. The air passes to the transfer ports by way of an annular valve assembly mounted co-axially about the pillar 9. The assembly includes a valve housing formed by two concentric walls 18, 19 (FIGURE 2) with a series of radial partitions 20 extending between them to form segmental ports 21. The transfer port of each blade has an entry of segmental shape (shown in dotted lines) which rides over the valve assembly, progressively receiving air from the ports 21 simultaneously according to the relative positions of the blades. In each segmental port is a valve member 22 slidable up and down to close or open the port (as shown at the left and right hand sides, respectively of FIGURE 1). The valve faces and the passages through the ports are shaped so that movement of a valve from the open to the closed position gives a progressive throttling of the passage. The ports open out of an annular chamber 23 surrounding the pillar. A duct 24 connected to a suitable air supply source (such as the compressor of a gas turbine power plant) feeds air into the annular chamber. Thus, air flows through the hub assembly from the duct 24 into the annular chamber, through the valve ports 21 (according to the position of the valves) and into the blades via the transfer ports thence passing to the blade discharge apertures.

Each valve member 22 is connected to one end of a spring loaded push rod 25, the other end of which is provided with a tappet head 26. A swash plate 27 is carried on a part spherical bearing 28 mounted co-axially about the pillar. The swash plate is formed with cylinder bores 29 at positions corresponding to each push rod. Each cylinder is provided with a piston 30 having an extension piece 31. The ends of the extension pieces normally lie flush with the upper face of the swash plate and form bearing surfaces for the push rod tappets 26. Pipe lines 32 are connected to each cylinder to admit pressure fluid beneath the piston causing its extension piece to protrude from the swash plate to increase the effective length of the associated push rod and move the attached valve independently of swash plate inclination. Withdrawal of extension pieces into the swash plate is effected by the admission of pressure fluid above the appropriate pistons through pipe lines 33. The bearing 28 forms part of a sleeve 34 slidably mounted on the pillar so as to be capable of movement axially along the pillar.

Movement of the sleeve 34 (together with the swash plate) up or down the pillar will move all valve members simultaneously in the same direction. By this means momentum of the air streams discharged from the apertures in opposite blades will be varied in the same sense to increase or decrease the total blade lift in similar fashion to conventional helicopter collective pitch control.

Tilting of the swash plate and movement of the sleeve may be obtained by operation of the pilot's controls in any suitable manner. For instance the swash plate may be controlled through differential adjustment of two hydraulic jacks set 90 degrees apart around the pillar and connected between the swash plate and some fixed structure. Similarly the sleeve member may be connected to the pillar supporting structure through the medium of one or more jacks or other linear actuators.

The aircraft is controlled when in flight in the helicopter role by control of the air supply to the boundary layer control apertures in the blades. Tilting the swash plate relative to the pillar gives a variation in valve opening circumferentially around the valve housing. The amount of air passing to the blade transfer ports and hence the relative momentum of the streams if thus varied in an appropriately phased relationship to the rotation of the rotor. Generally, it is desired to discharge more air from the apertures of the retreating blade than from those of the advancing blade. The overall effect is equivalent to the cyclic blade incidence changes (cyclic pitch control) in a conventional helicopter. The phase relationship between blade lift and rotor control can also be varied to effect roll and pitch control by varying the plane of inclination of the swash plate.

With no cyclic variation of aperture discharge the advancing blade suffers a large drop in lift while the retreating blade shows a comparatively small increase compared with the datum position. This state gives rise to a large mean rolling moment and considerable fluctuations in lift and rolling moment for the complete rotor. This type of lift variation is the opposite of that obtained in a conventional helicopter rotor. A sinusoidal variation of aperture discharge is therefore applied to make the time-mean rolling and pitching moments vanish, the lift on the advancing blade is increased and that on the retreating blade reduced—both by similar amounts until they are about equal.

Sinusoidal variation of slot thrust is obtained by throttling the aperture discharge at the valves and operating them directly from the swash plate.

Figure 3:
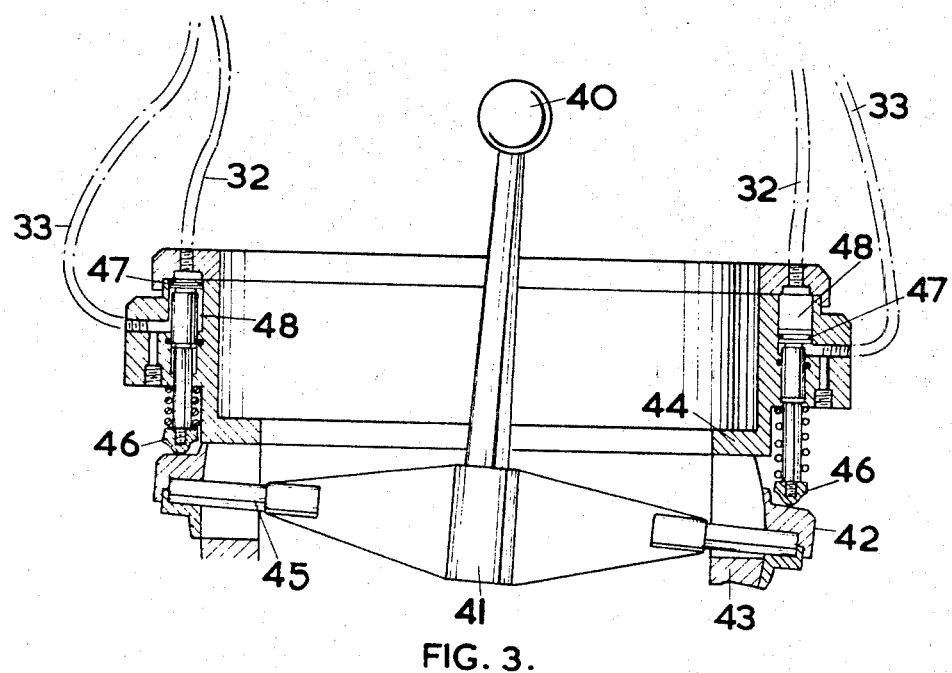
FIGURE 3 is a view in axial part section of a control for use in conjunction with the hub assembly of FIGURE 1.

Selective admission of pressure fluid to the cylinders 29 so as to alter the effective lengths of certain of the push rods 25 will have the effect of superimposing a further pattern of cyclic variation of aperture discharge on that governed by the swash plate 27. One means of applying such a variation is illustrated in FIGURE 3 wherein a control lever 40 attached to a spider 41 is employed to vary the inclination of a swash plate 42 riding on part spherical bearing 43 supported on body member 44. The arms of the spider have journals 45 passing through apertures formed in the bearing to engage the swash plate. Spring-loaded tappets 46 bearing on the upper face of the swash plate are connected to pistons 47 operating in cylinders 48 formed in the body member. Fluid containing pipe lines 32 and 33 extending from the hub swash plate (see FIGURE 1) are connected with the cylinders at positions above and below the pistons respectively. The number of cylinders corresponds to that in the hub swash plate (i.e. equal to the number of valves). Thus, movement of the control lever from its central position will tilt the swash plate 42 causing movement of certain of the tappets and their associated pistons. Dependent on the direction of piston movement pressure will be applied to the fluid in the appropriate pipe line which pressure will be transmitted to the relevant cylinder 29 in the hub swash plate (FIGURE 1) producing corresponding movement of its particular piston thus moving the valve operatively connected therewith.

It will be seen that differential valve opening to give cyclic variation of blade aperture discharge phased to rotation of the rotor can be produced by inclination of either the hub swash plate 27, separate swash plate 42 or both and by suitable control adjustment a suitable relationship between the lift variations due to each swash plate can be achieved.

Additionally the total rotor lift may be varied in accordance with changes in forward speed of the aircraft or other operating conditions by altering the collective control setting and thus the overall level of air discharge from the blade apertures.

The invention is not restricted to the precise embodiment disclosed in that the hydraulic means for varying the effective push rod lengths might be replaced by electrical actuators or other suitable known means including under certain circumstances the use of screw thread adjustment of the push rod tappets.

Similarly the separate swash plate used to give the further cyclic variation in lift could be replaced by cam means whereby fluctuations might be completely eliminated. It is envisaged that changes in valve positioning could be effected by computor control whereby full account is taken of prevailing operating conditions and appropriate lift compensation made automatically.

In an alternative construction the rotor blades may be pivotally attached to the rotor head in similar fashion to the arrangements of British Patents 944,010 and 948,947 and capable of being raised or lowered between a retracted or inoperative position in which they lie in a plane generally parallel to the longitudinal axis of the aircraft and an extended or operative position where they are then rigidly locked to the rotor head for operation.

We claim:
1. A control mechanism for a helicopter rotor having blades on which aerodynamic lift is induced by the discharge of fluid streams as thin layers over the blade surfaces, said mechanism comprising means for leading fluid to the rotor; first control means operable to regulate the flow of said fluid, said first control means comprising a valve assembly having a plurality of channels for fluid flow and a valve disposed in each of said channels, the valves being capable of adjustment differentially of each other, a swash plate operatively connected to the valves by means of push rods, and a control connected to tilt the swash plate; and second control means operable to regulate the flow of said fluid and comprising means for varying the effective lengths of the push rods.

2. A control mechanism as claimed in claim 1 in which the second control means operates to modify the profile of the swash plate.

3. A control mechanism as claimed in claim 1 in which actuators are provided in the swash plate corresponding to the push rods and are arranged to move the push rods independently of movement of the swash plate.

4. A control mechanism as claimed in claim 3 in which the actuators are pistons operated by fluid means.

5. A control mechanism as claimed in claim 3 in which the second control means further comprises a control connected to operate the actuators.

6. A helicopter rotor assembly having a control mechanism as claimed in claim 1.

7. A helicopter rotor assembly having a non-rotating member, a head member having at least one rotor blade attached thereto and rotatably mounted on said non-rotating member, wherein the improvement comprises a control mechanism for varying the aerodynamic lift on each blade, said control mechanism comprising a plurality of valves capable of being adjusted differentially of each other and disposed in separate channels each having inlets connected to a fluid supply and outlets disposed coaxially about the non-rotating member whereby fluid is led to the head member; first control means comprising a swash plate operatively connected to the valves by push rods and a control connected to tilt the swash plate; and second control means comprising means for varying the effective lengths of the push rods.

8. A helicopter rotor assembly having a non-rotating member, a head member having at least one rotor blade attached thereto and rotatably mounted on said non-rotating member, wherein the improvement comprises a control mechanism for varying the aerodynamic lift on each blade, said control mechanism comprising a plurality of valves capable of being adjusted differentially of each other and disposed in separate channels each having inlets connected to a fluid supply and outlets disposed coaxially about the non-rotating member whereby fluid is led to the head member; first control means comprising a swash plate operatively connected to the valves by push rods; and actuators provided in the swash plate corresponding to the push rods and arranged to move the push rods independently of movement of the swash plate.

9. A helicopter rotor assembly as claimed in claim 8 in which the rotor blades are substantially circular in cross-section.

10. A helicopter rotor assembly as claimed in claim 8 in which the actuators are pistons operated by fluid means.

11. A helicopter rotor assembly as claimed in claim 8 in which the second control means comprises a further control connected to operate the actuators.

12. A control mechanism for regulating the aerodynamic lift on a helicopter rotor having a non-rotating member, a rotating member with at least one rotor blade attached thereto and mounted on said rotating member, at least one aperture extending along the span of each blade, and means for leading fluid flow into the rotating member and for conducting fluid then into each blade for discharge from the aperture therein as a layer over the blade surface so as to induce lift on the blade; said control mechanism comprising a non-rotating annular valve assembly mounted coaxially relative to said rotating member and having concentric walls with radical portions extending between them so as to form a plurality of axially extending passages for the fluid flow to the rotating member and a valve slidably mounted in each of said passages to vary the flow therethrough, a first control arranged to vary the position of the valves differentially in the channels, and a second control operatively connected to the valves to give further differential variations of their positions.

13. A control mechanism according to claim 12, in which the first control comprises a non-rotating swash plate which is tiltable to vary the positions of the valves.

14. A control mechanism according to claim 13, in which the swash plate is operatively connected to the valves by push rods.

15. A control mechanism according to claim 14, in which the second control acts to vary the effective lengths of the push rods.

16. A control mechanism according to claim 15, in which actuators are provided in the swash plate to move the push rods independently of movement of the swash plate.

References Cited

UNITED STATES PATENTS 3,109,494  11/1963  Davidson et al. _____ 170—135.4
3,139,936  7/1964  Davidson et al. _____ 170—135.4

MARTIN P. SCHWADRON, *Primary Examiner.*

EVERETTE A. POWELL, JR., *Examiner.*